March 27, 1962 J. E. CHARIPAR 3,027,186
AUTOMOTIVE VEHICLE BODY ROOF SUPPORT
Filed Aug. 10, 1956 3 Sheets-Sheet 1
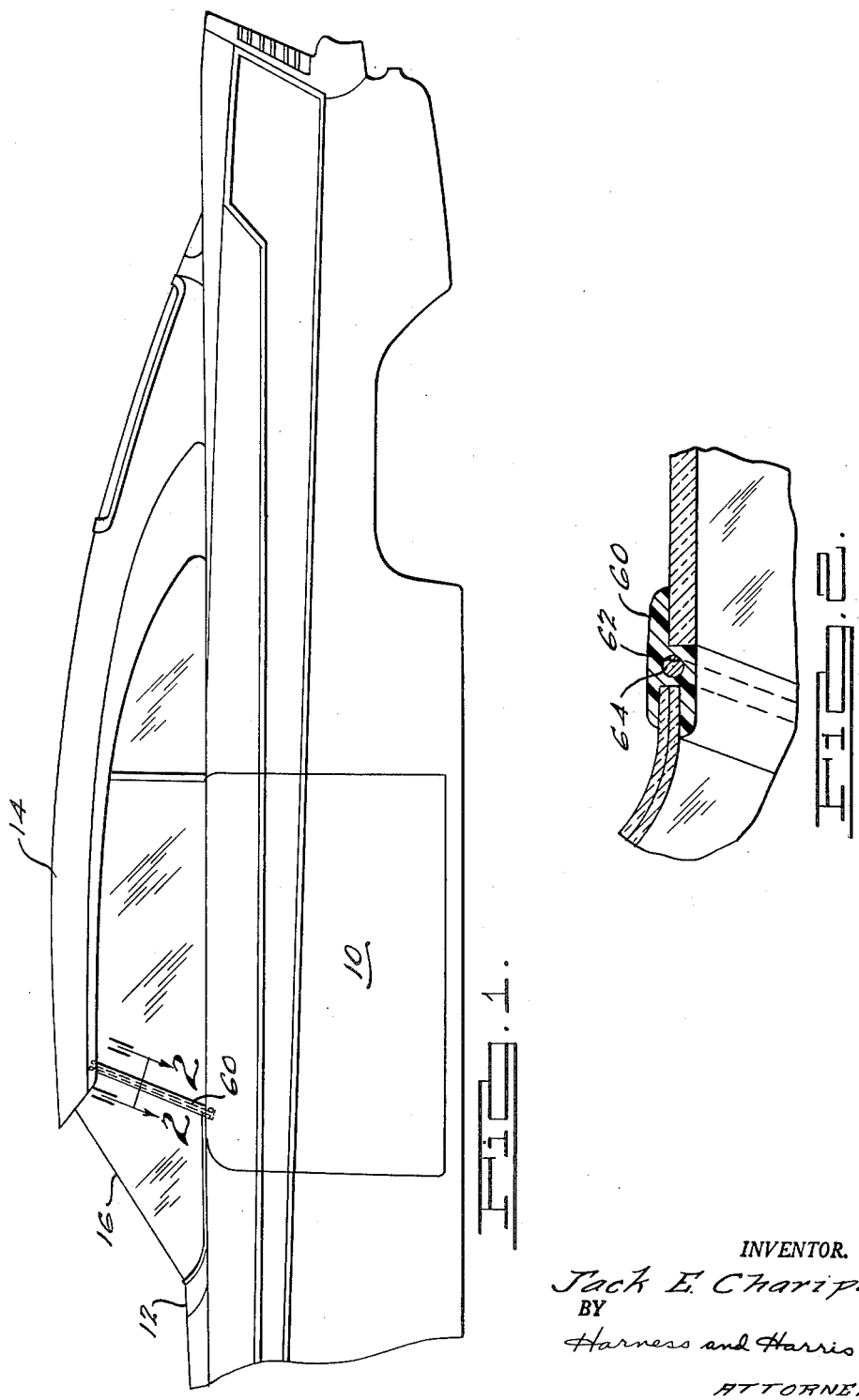
INVENTOR.
Jack E. Charipar
BY
Harness and Harris
ATTORNEYS.

March 27, 1962  J. E. CHARIPAR  3,027,186
AUTOMOTIVE VEHICLE BODY ROOF SUPPORT
Filed Aug. 10, 1956  3 Sheets-Sheet 2
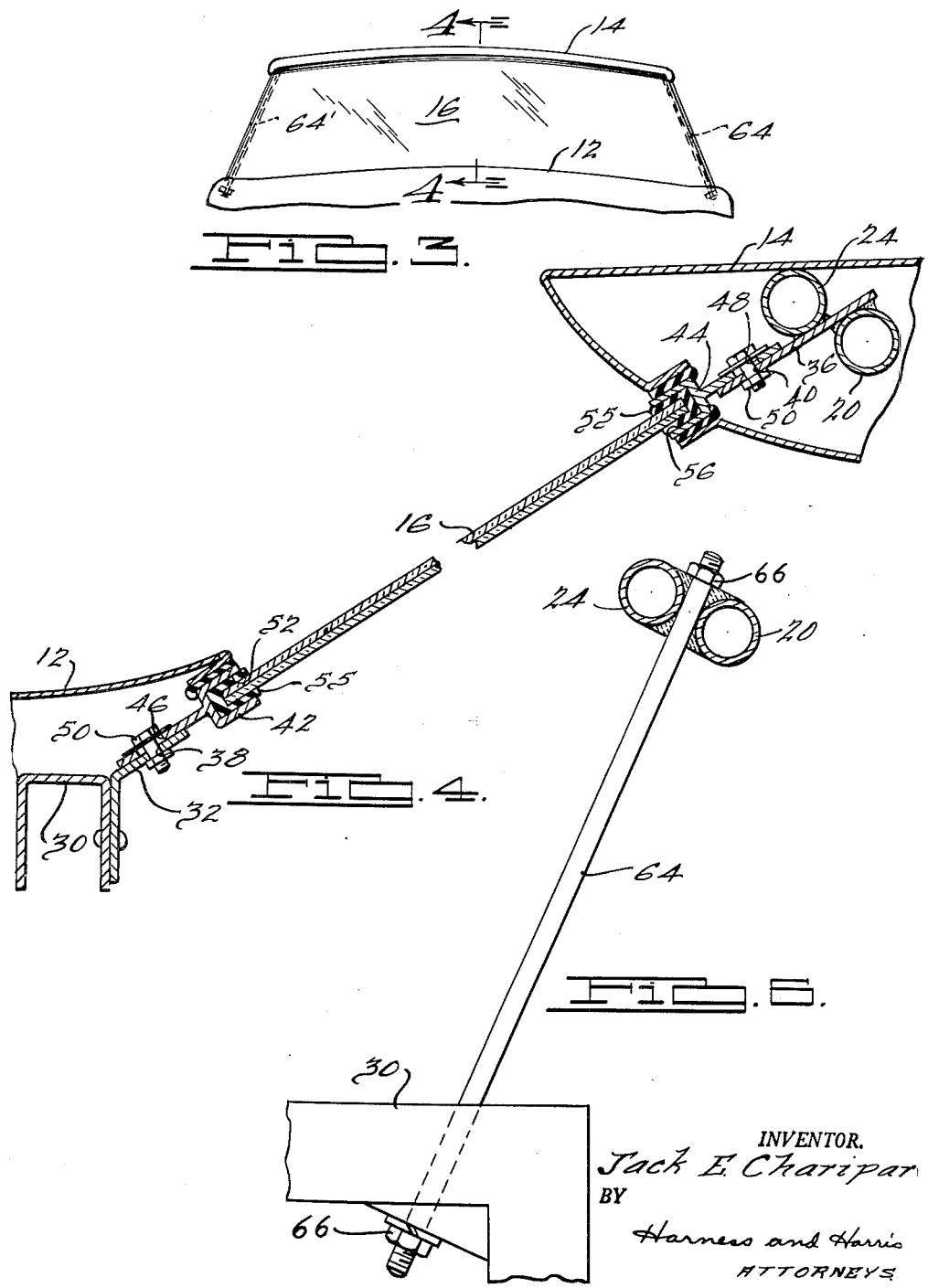
INVENTOR.
Jack E. Charipar
BY
Harness and Harris
ATTORNEYS March 27, 1962 J. E. CHARIPAR 3,027,186
AUTOMOTIVE VEHICLE BODY ROOF SUPPORT
Filed Aug. 10, 1956 3 Sheets-Sheet 3
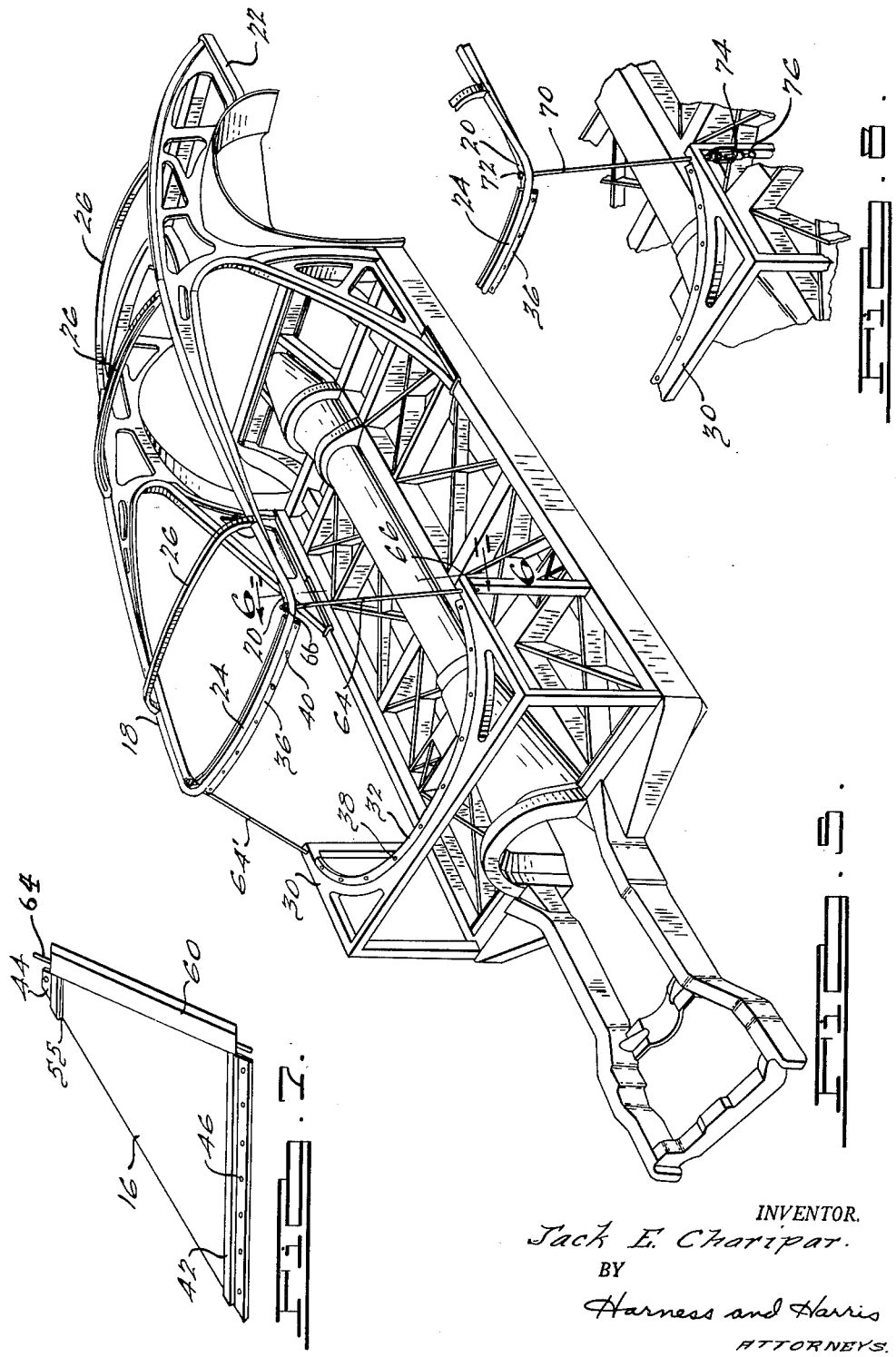
INVENTOR.
Jack E. Charipar.
BY
Harness and Harris
ATTORNEYS.

United States Patent Office 3,027,186
Patented Mar. 27, 1962

3,027,186
AUTOMOTIVE VEHICLE BODY ROOF SUPPORT
Jack E. Charipar, Royal Oak, Mich., assignor to Chrysler Corporation, Highland Park, Mich., a corporation of Delaware
Filed Aug. 10, 1956, Ser. No. 603,260
4 Claims. (Cl. 296—28)

This invention relates to automobile body construction and more particularly to the application of tensioning means to the forward end of an automobile cantilever roof structure.

Automobiles of several decades ago utilized a flat windshield glass with a pillar extending vertically between the cowl and the roof at each end of the windshield. Evolutions from this early design have included the steps of inclining the windshield, making it V-shaped and giving it a curvature. In recent years an additional refinement which has been generally adopted by the industry includes moving the "A" posts rearwardly and providing a dog leg in the forward edge of the door to provide a windshield that is often referred to as a "wrap around" windshield. However, each of the above mentioned design evolutions has required the presence of the aforementioned pillars, hereinafter referred to as "A" posts, at the respective ends of the windshield.

In the above evolution of commercial automobiles the "A" posts have been a necessary evil in that they provide structural strength for the forward portion of the roof, but they interfere with vision and their elimination is recognized as a desirable objective. Roofs of a cantilever type which are unsupported at the forward end other than by the windshield glass itself are being considered and one example of such a cantilever roof is shown in J. L. Thompson Patent 2,626,180 which issued on January 20, 1953. However, the automobile illustrated in the above mentioned patent retains a structural post at the rear edge of the front door and elimination of this post is desirable although elimination of such post increases the length of the unsupported overhanging portion of the cantilever roof and thereby lessens the stability of the roof. Stability of the roof is imperative for excessive twisting and bouncing of the forward end of the roof must not be permitted so that rattles and deflection thereof sufficient to permit the windshield to fall out of its mounting will not occur.

This invention is directed to an improvement in cantilever roof constructions. Automobile windshields are capable of carrying uniformly distributed compression and shear loads, but it is difficult to attach the glass to the cowl and roof so that tension loads can be transmitted thereto. It is an object of this invention to utilize adjustable rods or wires, which present a minimium visual obstruction, between the cowl and roof and to place these rods or wires in tension so that the roof is actually forced down to compress the windshield in an amount to limit the load carried by the windshield during normal operating conditions to one of compression.

It is a further object of the invention to utilize the "tumble home" of the vehicle body to provide lateral stability. "Tumble home" relates to the fact that in many commercial automobile bodies the roof is narrower than the body width at the cowl or belt line so that the upper portion of the sides and "A" post converge upwardly.

It is an additional object of the invention to provide a transparent sealing strip between the edge of the windshield and the door and to locate the tension means in the transparent sealing strip.

In the drawings:
FIG. 1 is a side elevational view of an automobile body incorporating my invention;

FIG. 2 is a fragmentary sectional view taken on the line 2—2 of FIG. 1;
FIG. 3 is a fragmentary front elevational view of a portion of the automobile illustrated in FIG. 1;
FIG. 4 is a vertical section taken on the line 4—4 of FIG. 3;
FIG. 5 is a perspective view of the skeleton structure of the vehicle body illustrated in FIG. 1;
FIG. 6 is a fragmentary view taken on the line 6—6 of FIG. 5;
FIG. 7 is a side elevational view of the windshield and its associated mounting means; and
FIG. 8 is a fragmentary perspective view of a modified form of the invention wherein tension wire is utilized rather than a tension rod as illustrated in FIG. 5.

An automobile body 10 includes a cowl structure 12, a roof structure 14 which is spaced from the cowl structure and a windshield 16 which is supported by the cowl and roof structure in the space therebetween.

The roof 14 is of the cantilever type and is illustrated in FIG. 5 as deriving its structural strength from a pair of spaced side rails 18 and 20 which are securely fastened to the rear portion of a main chassis frame 22. A windshield header 24 connects the leading edges of the side rails 18 and 20 and a plurality of transverse beams 26 are provided at spaced intervals along the side rails 18 and 20. The cowl structure 12 includes a supporting framework 30 carried by the main chassis frame 22. The supporting framework 30 and the roof header 24 are respectively provided with inclined plates 32 and 36 which are apertured respectively at 38 and 40. A pair of adjustable windshield mounting brackets 42 and 44 are respectively mounted on inclined plates 32 and 36. The brackets 42 and 44 are respectively provided with elongated apertures 46 and 48 which accommodate up and down adjustment of the respective brackets relative to the mounting plates 32 and 36. Suitable bolt and nut assemblies 50 are utilized to secure the brackets 42 and 44 in their adjusted positions. Adjustment of the brackets 42 and 44 facilitates installation of the windshield 16 during assembly. The brackets 42 and 44 preferably have channel shaped portions 52 and 56, respectively, which receive the edges of the windshield glass 16. Suitable resilient mounting strips, such as rubber strips 55, are provided in the U-shaped channels 52 and 56.

Referring to FIG. 1 it will be seen that a plastic weatherstrip 60 is visible in the conventional A post location. The plastic is preferably transparent and the word "visible" as used in the preceding sentence refers to the illustration in the drawing rather than any emphasis on its visibility to an occupant of the vehicle. The weatherstrip 60 is provided with a channel 62 which extends longtiudinally therethrough as shown in FIG. 2 and a tension rod 64 is mounted in the channel 62. The rod 64 has its upper and lower ends threaded and they extend respectively through apertures provided in the roof side rail 20 and the cowl supporting framework 30. Suitable threaded nuts 66 are provided to retain the rod in place and to permit adjustment of it. The nuts 66 may be drawn tight and this will place the rod 64 in tension and urge the roof header 24 and the cowl 12 toward each other. The rod 64 is on one end of the windshield and a companion and similar rod 64' is on the other corner of the windshield.

FIG. 3 illustrates the "tumble home" and the fact that the rods 64 and 64' converge upwardly. This provides a lateral component to the rods to improve lateral stability of the roof.

In FIG. 8 a modified form of the invention is illustrated in which a tension wire 70 is substituted for the rod 64. The wire 70 is secured to the roof structure at 72 and it penetrates the supporting framework 30 of the cowl and is secured to a turnbuckle 74 which in turn is secured to the supporting framework 30 at 76. The turnbuckle provides a means for adjusting the amount of tension in the wire 70. A similar wire and mounting therefor (which are not illustrated) are utilized on the opposite end of the windshield in the same manner that the rod 64' complements the rod 64 of FIG. 5.

I claim:

1. In an automobile body comprising a cowl structure having an upper visible surface, a roof structure spaced from said cowl structure and having a lower visible surface with each of said structures provided with a channel-shaped member adapted to embrace an edge of a windshield, a windshield having its upper and lower edges respectively received in said channel-shaped members to accommodate support of said windshield by said structures in the space therebetween, a pair of tension elements interconnecting said structures, each of said tension elements having an upper portion concealed by the above mentioned lower visible surface of said roof structure and having a lower portion concealed by the above mentioned upper visible surface of said cowl structure, mechanism associated with each of said tension elements and operable to secure the upper portion of the tension element of said roof structure above the associated lower visible surface of said roof structure and mechanism associated with each of said tension elements and operable to secure the lower portion of the tension element to said cowl structure below the associated upper visible surface of siad cowl structure, one of the mechanisms associated with each of said tension elements being adjustable lengthwise of its associated tension element to draw said structures relatively together to thereby place said windshield in compression.

2. In an automobile body comprising a cowl structure, a roof structure spaced from said cowl structure with each of said structures provided with a channel-shaped member adapted to embrace an edge of a windshield, a windshield having its upper and lower edges respectively received in said channel-shaped members to accommodate support of said windshield by said structures in the space therebetween, said structures being provided with first and second pairs of aligned openings respectively located adjacent opposite ends of said windshield, each of the above mentioned pairs of openings including a first opening in said roof structure and an aligned second opening in said cowl structure, a pair of tension elements interconnecting said structures and respectively associated with the above mentioned first and second pairs of openings, each of said tension elements having an upper portion extending through the first opening of the pair of openings with which it is associated and having a lower portion extending through the aligned second opening of that pair of openings, mechanism associated with each of said tension elements and operable to abut said roof structure above the associated first opening and mechanism associated with each of said tension elements and operable to abut said cowl structure below the associated second opening, one of the mechanisms associated with each of said tension elements being adjustable lengthwise of its associated tension element to draw said structures relatively together to thereby place said windshield in compression.

3. In an automobile body comprising a cowl structure, a roof structure spaced from said cowl structure with each of said structures provided with a channel-shaped member adapted to embrace an edge of a windshield, a windshield having its upper and lower edges respectively received in said channel-shaped members to accommodate support of said windshield by said structures in the space therebetween, said structures being provided with first and second pairs of aligned openings respectively located adjacent opposite ends of said windshield, each of the above mentioned pairs of openings including a first opening in said roof structure and an aligned second opening in said cowl structure, a pair of threaded rods interconnecting said structures and respectively associated with the above mentioned first and second pairs of openings, each of said rods having an upper portion extending through the first opening of the pair of openings with which it is associated and having a lower portion extending through the aligned second opening of that pair of openings, mechanism associated with each of said rods and operable to abut said roof structure above the associated first opening and mechanism associated with each of said rods and operable to abut said cowl structure below the associated second opening, at least one of the mechanisms associated with each of said rods comprising threaded apparatus adjustable lengthwise of its associated threaded rod to draw said structures relatively together to thereby place said windshield in compression.

4. In an automobile body comprising a cowl structure, a roof structure spaced from said cowl structure with each of said structures provided with a channel-shaped member adapted to embrace an edge of a windshield, a windshield having its upper and lower edges respectively received in said channel-shaped members to accommodate support of said windshield by said structures in the space therebetween, said structures being provided with first and second pairs of aligned openings respectively located adjacent opposite ends of said windshield, each of the above mentioned pairs of openings including a first opening in said roof structure and an aligned second opening in said cowl structure, a pair of tension wires interconnecting said structures and respectively associated with the above mentioned first and second pairs of openings, each of said tension wires having an upper portion extending through the first opening of the pair of openings with which it is associated and having a lower portion extending through the aligned second opening of that pair of openings, mechanism associated with each of said tension wires and operable to secure the wire to said roof structure above the associated first opening and mechanism associated with each of said tension wires and operable to secure the wire to said cowl structure below the associated second opening, one of the mechanisms associated with each of said tension wires being adjustable to impart tension to its associated tension wire to draw said structures relatively together to thereby place said windshield in compression.

References Cited in the file of this patent

UNITED STATES PATENTS

| | | |
|---|---|---|
| 1,328,383 | Ludlow | Jan. 20, 1920 |
| 2,157,366 | Vigroux | May 9, 1939 |
| 2,437,664 | Hicks | Mar. 9, 1948 |
| 2,626,180 | Thompson | Jan. 20, 1953 |
| 2,842,394 | MacPherson | July 8, 1958 |

FOREIGN PATENTS

| | | |
|---|---|---|
| 811,520 | France | Jan. 18, 1937 |
| 817,598 | France | May 31, 1937 |